(12) United States Patent
Joughin

(10) Patent No.: US 9,857,478 B2
(45) Date of Patent: Jan. 2, 2018

(54) APPARATUS AND METHOD TO MOUNT STEERING ACTUATOR

(71) Applicant: AgJunction LLC, Hiawatha, KS (US)

(72) Inventor: Alan Robert Joughin, Union City, CA (US)

(73) Assignee: AGJUNCTION LLC, Hiawatha, KS (US)

( * ) Notice: Subject to any disclaimer, the term of this patent is extended or adjusted under 35 U.S.C. 154(b) by 190 days.

(21) Appl. No.: 15/007,081

(22) Filed: Jan. 26, 2016

(65) Prior Publication Data

US 2016/0214643 A1    Jul. 28, 2016

Related U.S. Application Data

(60) Provisional application No. 62/108,186, filed on Jan. 27, 2015.

(51) Int. Cl.
| | |
|---|---|
| *A01B 69/00* | (2006.01) |
| *G01S 19/42* | (2010.01) |
| *B62D 1/00* | (2006.01) |
| *B62D 5/04* | (2006.01) |
| *G01S 19/14* | (2010.01) |

(52) U.S. Cl.
CPC ............. *G01S 19/42* (2013.01); *B62D 1/00* (2013.01); *B62D 5/04* (2013.01); *G01S 19/14* (2013.01)

(58) Field of Classification Search
CPC ........... G01S 19/42; G01S 19/14; B62D 1/00; B62D 5/04
USPC .............................. 701/36, 41; 180/408, 411
See application file for complete search history.

(56) References Cited

U.S. PATENT DOCUMENTS

| | | | | |
|---|---|---|---|---|
| 5,014,802 A | * | 5/1991 | Knoll | B62D 7/159 180/408 |
| 5,160,003 A | * | 11/1992 | Suzuki | F16H 61/143 192/3.31 |
| 5,194,851 A | | 3/1993 | Kraning et al. | |
| 5,390,125 A | | 2/1995 | Sennott et al. | |
| 5,402,344 A | * | 3/1995 | Reister | B62D 7/159 180/197 |

(Continued)

OTHER PUBLICATIONS

Noh, Kwang-Mo, Self-tuning controller for farm tractor guidance, Iowa State University Retrospective Theses and Dissertations, Paper 9874, (1990).

(Continued)

*Primary Examiner* — Gertrude Arthur Jeanglaude
(74) *Attorney, Agent, or Firm* — Schwabe Williamson & Wyatt

(57) ABSTRACT

A steering actuator system to be mounted to the steering wheel and steering column of a vehicle. The steering actuator system includes a flat baseplate with multiple adjustable sliders. These sliders slide along channel guides within the flat baseplate to accommodate steering wheels of varying sizes. The system includes a gear which mounts below the steering wheel, possibly around the steering column of the vehicle. A steering actuator powered by a motor or some other power source is connected to the gear and when activated can actively steer the vehicle. When connected to a guidance system, the vehicle can automatically be guided and steered via the guidance system and the steering actuator system. This provides a convenient way to add automatic steering to any vehicle with a steering wheel.

19 Claims, 5 Drawing Sheets

(56) References Cited

U.S. PATENT DOCUMENTS

| | | | |
|---|---|---|---|
| 5,663,879 A | 9/1997 | Trovato et al. | |
| 5,923,270 A | 7/1999 | Sampo et al. | |
| 6,052,647 A | 4/2000 | Parkinson et al. | |
| 6,070,673 A | 6/2000 | Wendte | |
| 6,169,951 B1 * | 1/2001 | Ghoneim | B60T 8/172 |
| | | | 303/140 |
| 6,212,453 B1 | 4/2001 | Kawagoe et al. | |
| 6,377,889 B1 | 4/2002 | Soest | |
| 6,445,983 B1 | 9/2002 | Dickson et al. | |
| 6,539,303 B2 | 3/2003 | McClure et al. | |
| 6,789,014 B1 | 9/2004 | Rekow et al. | |
| 6,819,780 B2 | 11/2004 | Benson et al. | |
| 6,865,465 B2 | 3/2005 | McClure | |
| 6,876,920 B1 | 4/2005 | Mailer | |
| 7,142,956 B2 | 11/2006 | Heiniger et al. | |
| 7,277,792 B2 | 10/2007 | Overschie | |
| 7,437,230 B2 | 10/2008 | McClure | |
| 7,460,942 B2 | 12/2008 | Mailer | |
| 7,912,606 B2 * | 3/2011 | Auguet | B62D 5/003 |
| | | | 180/408 |
| 8,190,337 B2 | 5/2012 | McClure | |
| 8,589,013 B2 | 11/2013 | Pieper et al. | |
| 8,649,930 B2 | 2/2014 | Reeve et al. | |
| 2002/0072850 A1 | 6/2002 | McClure et al. | |
| 2004/0186644 A1 | 9/2004 | McClure et al. | |
| 2005/0049761 A1 * | 3/2005 | Kataoka | B60G 17/016 |
| | | | 701/1 |
| 2006/0167600 A1 | 7/2006 | Nelson, Jr. et al. | |
| 2010/0274452 A1 | 10/2010 | Ringwald et al. | |

OTHER PUBLICATIONS

Van Zuydam,. R.P., Centimeter-Precision Guidante of Agricultural Impleet ns in the Open Field by Means of Real Tim Kinematic DGPS, ASA-CSSA-SSSA, pp. 1023-1034 (1999).

* cited by examiner

APPARATUS AND METHOD TO MOUNT STEERING ACTUATOR

CROSS-REFERENCE TO RELATED APPLICATION

This application claims priority in U.S. Provisional Patent Application No. 62/108,186, filed Jan. 27, 2015, which is incorporated herein by reference.

BACKGROUND OF THE INVENTION

1. Field of the Invention

The present invention is in the technical field of vehicle engineering. More particularly, the present invention is in the technical field of Global Navigation Satellite System (GNSS) auto-steering applications.

2. Description of the Related Art

Several electric actuators have been developed for automatically turning the steering wheel of vehicles. These systems use electric motors and drive mechanisms to turn the steering wheel through friction wheels, gears, belt drives and direct drive motors installed under the steering wheel.

A prior-art method is disclosed in a product called EZ-Steer launched by Trimble Navigation Ltd. Of Sunnyvale, Calif. in 2004 that uses an electric motor with a soft friction wheel to turn the steering wheel of agricultural machines such as tractors, sprayers and combine harvesters. The electric motor is mounted on the steering column and can be engaged against the steering wheel or disengaged. Although very simple, the roller can interfere with normal vehicle steering since it is an obstacle for the driver's hand.

Another prior-art method of steering actuation is disclosed in a product called EZ-Pilot launched by Trimble Navigation Ltd. on Aug. 30, 2011 consists of a direct drive motor installed under a new steering wheel and connected to a spline on the steering shaft. It uses anti-rotation brackets installed on the vehicle steering column.

A prior-art method of electric steering actuator for steering tractors and farm machinery is disclosed in a product called AES-25 launched by Topcon Corp. of Tokyo, Japan in 2009. It consists of an electric motor mounted under a steering wheel between the steering wheel and the steering shaft. A pin and anti-rotation bracket attached to the steering column prevents rotation. A new flat steering wheel replaces the factory steering wheel that is removed to complete the installation.

All the previously mentioned steering actuators significantly interfere with the factory steering wheel, or require the factory steering wheel to be removed for installation.

Heretofore there has not been available a system or method for steering actuator mounting with the advantages and features of the present invention.

SUMMARY OF THE INVENTION

The present invention is an apparatus and method for installing electrical, mechanical or other steering actuators above or below the factory steering wheel on vehicles, without having to remove the steering wheel while fitting even on steering wheels with two or fewer spokes and steering wheels with uneven spoke spacing.

The invention attaches the actuator to the steering wheel rim instead of the spokes, hub or splines as performed in the prior art. Existing steering wheels typically have between one and four spokes. The invention will fit steering wheels with any number of spokes because it does not rely on the spokes as a mounting feature.

The adjustment mechanism of the invention allows the precise centering of the steering actuator so that it is aligned with the steering shaft.

The adjustment mechanism of the invention and the three points of contact with the steering wheel rim allow the invention to be retained securely through friction inside the steering wheel. The secure retention allows the transmission of torque from a steering wheel actuator to the steering wheel for purposes of steering the vehicle.

The adjustment mechanism of the invention will accommodate steering wheels or rims of different sizes, as typically found on tractors and other vehicles. Although initially designed for typical steering wheels with an internal diameter of 300 to 380 mm, the invention will fit steering wheels of any size with the appropriate sizing of the parts to match the steering wheel.

The invention can be installed from above the steering wheel, without removing the factory steering wheel from the vehicle.

The invention has a very simple method of adjustment, consisting of a flat center plate with channel guides and three guided sliders that can be adjusted radially to accommodate different sizes of steering wheels. A screw and hex nut or locknut is used as the adjustment device. The hex nut is retained inside a hex void feature in the slider. The center plate can be made from aluminum or other light structural material and the adjustable sliders can be made from plastic polymers or other appropriate materials.

The invention has adjustable sliders of a novel design that simplify the assembly and reduce the number of parts. The invention as shown only has two distinct parts; the center plate and the slider elements, and the total number of nonstandard hardware parts is only four (one center plate and three sliders). The low part count leads to simplicity and low cost.

The invention is capable of installing a steering actuator on virtually any round steering wheel on tractors and other vehicles, boats and machines. The invention can also install other devices on other circular objects. The invention does not require vehicle specific splines, rings or spoke adapters.

The invention can be used in any vehicle application, such as retrofitting steering actuators on cars, trucks, military vehicles, golf carts, vehicles for disabled people, autonomous vehicles, boats or anywhere that you need to install an actuator to a rim or round object for steering purposes or other purposes.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning. Additional examples include computing devices such as a mobile smart device including a display device for viewing a typical web browser or user interface will be commonly referred to throughout the following description. The type of device, computer, display, or user interface may vary when practicing an embodiment of the present invention. A computing device could be represented by a desktop personal computer, a laptop computer, "smart" mobile phones, PDAs, tablets, or other handheld computing devices. These devices include a computing processor unit (CPU), graphical user interface (GUI), and memory storage elements at the very least.

II. Preferred Embodiment Steering Actuator System 2

Figure 1:
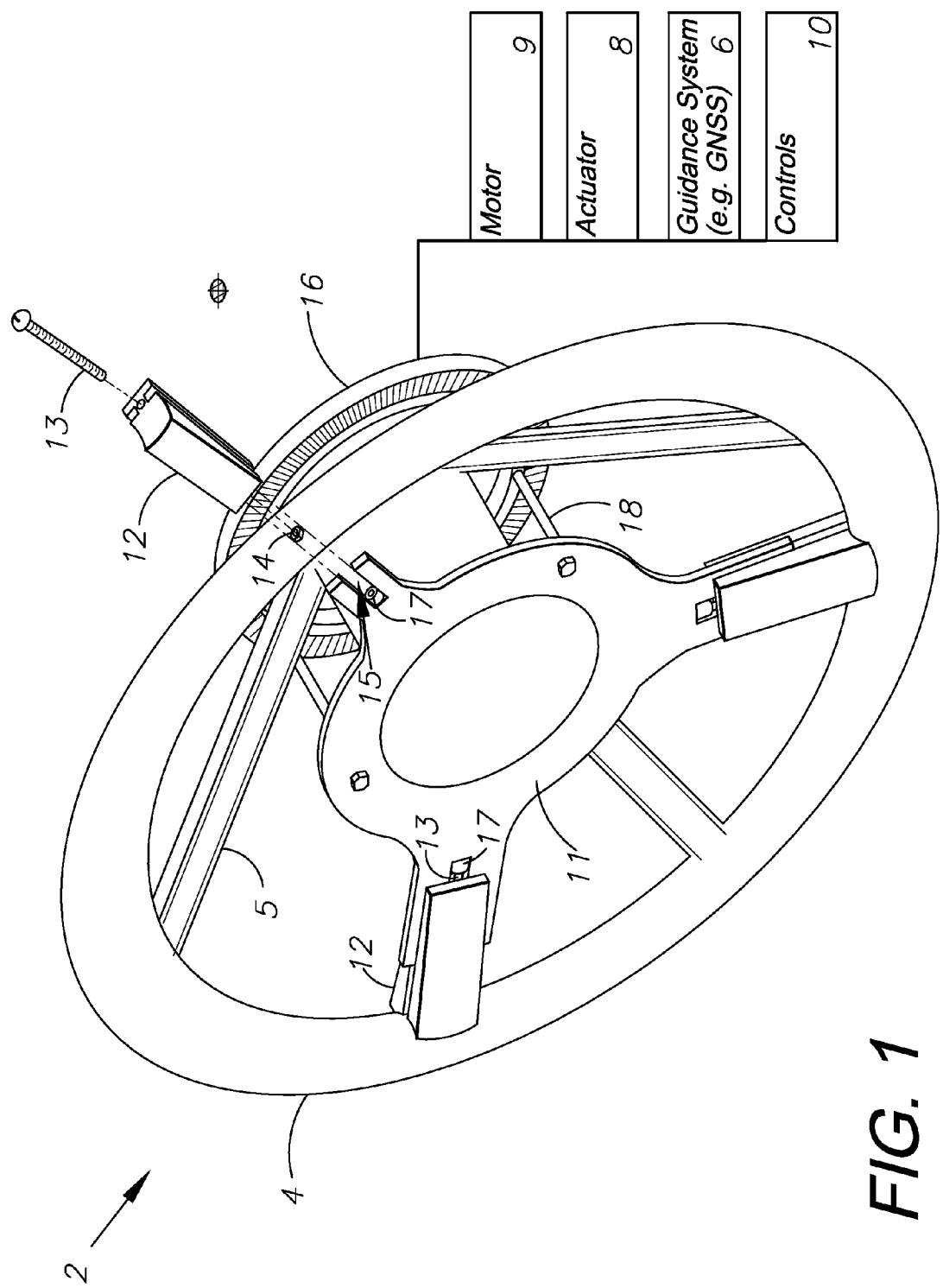
FIG. 1 is a three-dimensional isometric view of a preferred embodiment of the present invention interacting with a typical environment.

FIG. 1 depicts an embodiment of the apparatus to install a steering actuator on an existing vehicle steering wheel 4. The center plate 11 engages three movable sliders 12. The sliders may be adjusted using an adjustment screw 13. The invention has a very simple method of adjustment, consisting of a flat center plate 11 with channel guides 15 and three guided sliders 12 that can be adjusted radially to accommodate steering wheels 4 of different diameters. A screw 13 and locknut 14 or bushing are used as the adjustment device. The hex locknut is retained inside a hex void feature in the slider 12. An optional connector 17 connected within the channel guides 15 of the center plate 11 includes a blind hole for receiving the tip of the screw 13 and prevents the screw from making contact with the metal center plate. This also produces smoother rotation of the screw while protecting the center plate.

The center plate 11 can be made from aluminum or other light structural material and the adjustable sliders can be made from plastic polymers or other appropriate materials. The adjustment mechanism of the invention allows the precise centering of the apparatus and steering actuator so that it is aligned with the steering wheel shaft. The adjustment mechanism of the invention will accommodate steering wheels of different sizes, as typically found on tractors and other vehicles. Although initially designed for typical steering wheels with an internal diameter of 300 to 380 mm, the invention will fit steering wheels of any size with the appropriate sizing of the parts.

Figure 2:
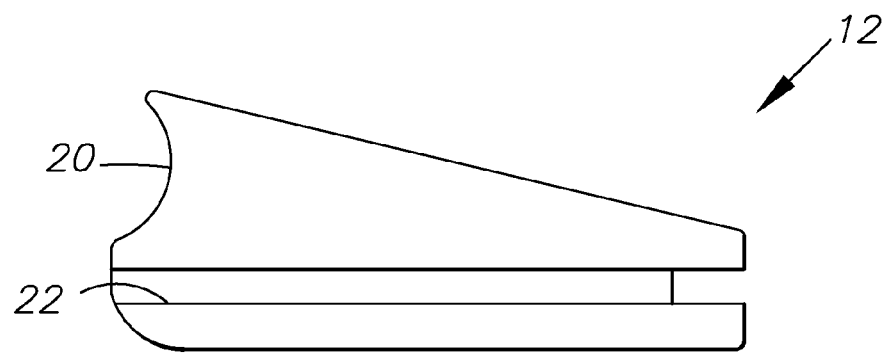
FIG. 2 is a side elevational view of an embodiment of a moveable slider element of the present invention.
Figure 3:
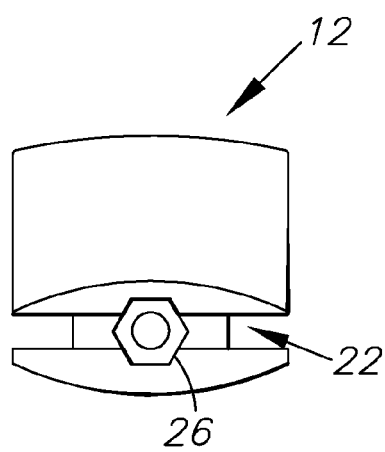
FIG. 3 is a front elevational view thereof.
Figure 4:
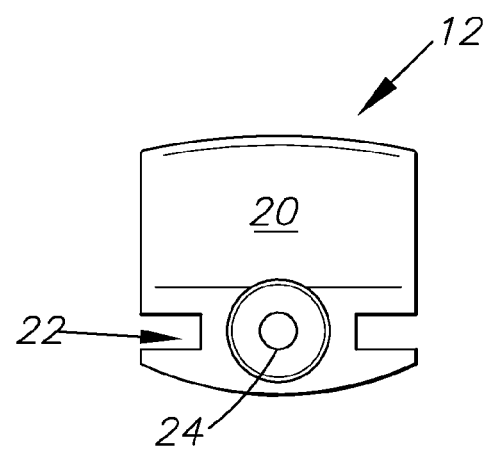
FIG. 4 is a rear elevational view thereof.
Figure 5:
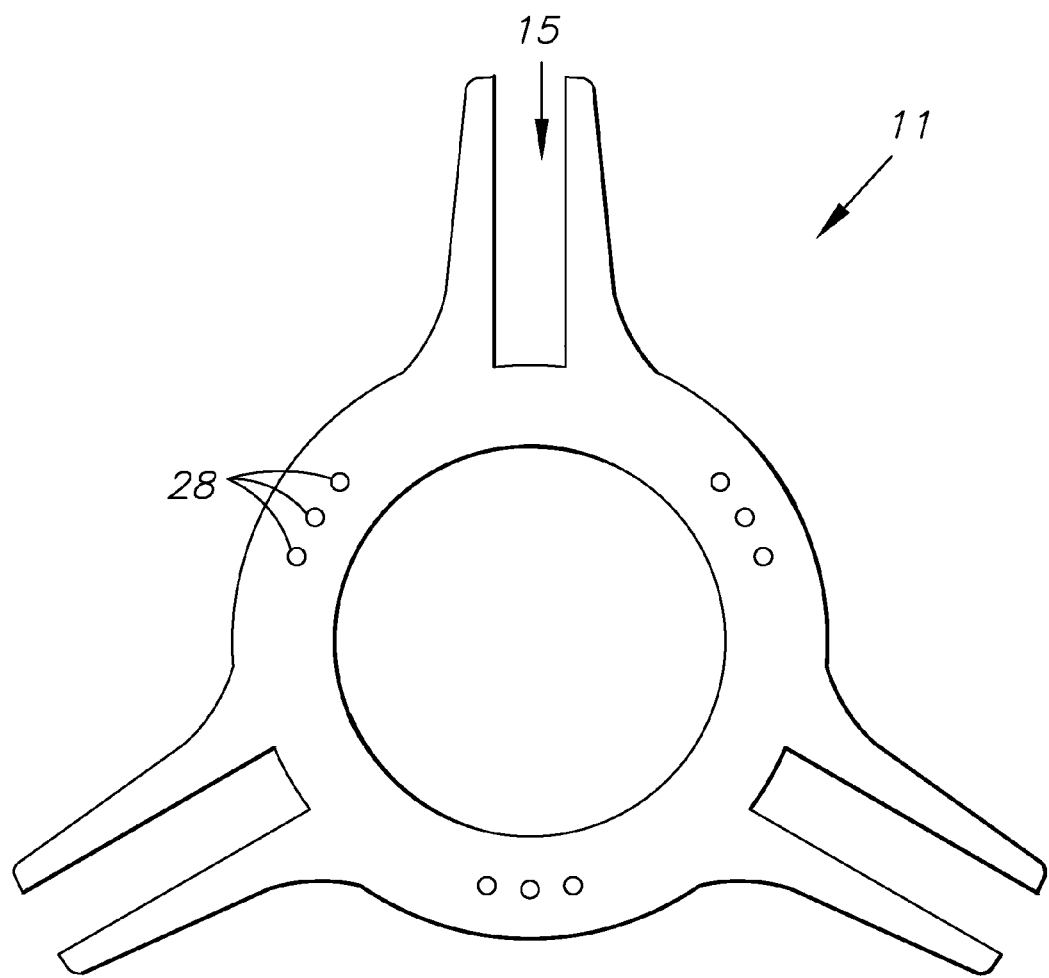
FIG. 5 is a top plan view of an embodiment of a base plate element of the present invention.

FIGS. 2-4 show additional detail of the moveable sliders 12. The adjustment screws 13 pass through a receiver hole 24 in the guided sliders 12. The extremity of the guided sliders 12 have a concave-shaped receiver face 20 to fit the inside surface of the steering wheel when installed. The concave wedge shape of the receiver face 20 provides a snug and tight fit on the steering wheel to avoid slippage while fitting steering wheels that have different rim cross section diameters. The lock nut 14 is received within the lock nut receiver 26 of the slide 12. The slide 12 engages with the channel guides 15 via a receiver slot 22.

Figure 6:
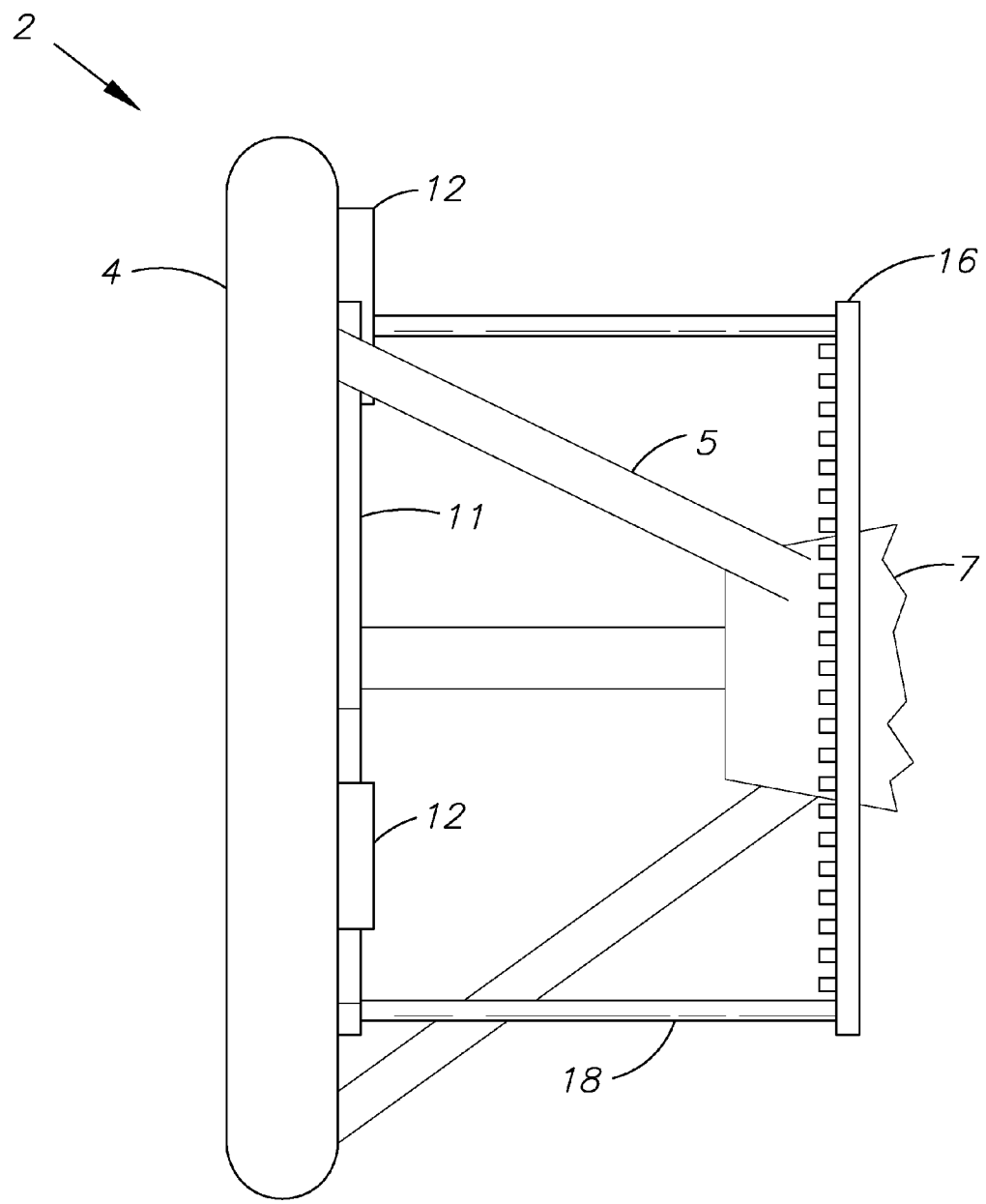
FIG. 6 is a side elevational view of the preferred embodiment of the present invention interacting with a typical environment.

The three guided sliders 12 are shown touching the inside surface of the steering wheel rim. The three adjustment screws 13 are tightened to increase the friction between the adjustable sliders 12 and the steering wheel rim for a secure retention on the steering wheel. A gear 16 from a steering wheel actuator is shown mounted under the steering wheel through three screws and spacers 18 that are attached under the flat center plate 11 as an example of how a steering actuator can be mounted using the invention. FIGS. 1 and 6 show how the gear 16 is mounted around the steering column 7 of the vehicle, and how the screws and spacers 18 can fit around the spokes 5 of the steering wheel 4, to be received into one of the many receiver slots 28 on the plate 11.

Figure 7:
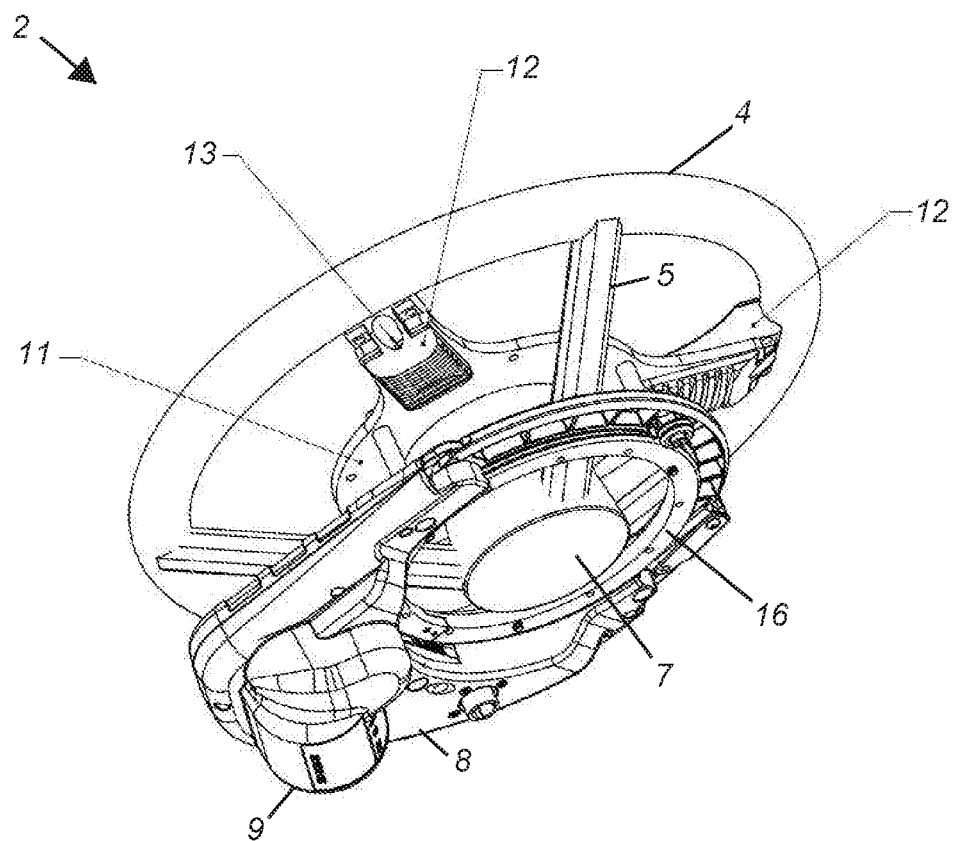
FIG. 7 is a three-dimensional isometric view of a preferred embodiment of the present invention.

FIG. 7 depicts a bottom orthogonal view of the apparatus to install a steering wheel actuator 8 installed on a steering wheel 4 and being used to secure a steering actuator. The three guided sliders 12 are shown touching the inside surface of the steering wheel 4 rim. A steering wheel actuator 8 is shown mounted under the steering wheel 4 through three screws and spacers 18 that are attached under the flat center plate 11 as an example of how a steering actuator can be mounted using the invention. The motor 9 is connected to and powers the actuator.

A guidance system 6 is used in conjunction with the steering actuator system 2 for controlling the actuator system 2 and employing automatic steering to the vehicle to which the actuator system 2 is attached. This allows any vehicle to quickly and easily be updated to include an automatic steering system which can automatically steer and drive a vehicle based on directions received from the guidance system 6. The guidance system may be a global navigation satellite system (GNSS) including at least one antenna and one receiver. A portable smart device, such as a "smart phone" or a tablet computer can be used to provide these elements and may be electrically connected to the actuator system 2 to provide steering instructions to the actuator.

Controls 10 allow the automatic steering to be engaged or disengaged. These controls may be separate from the guidance system 6, or may be incorporated therein (e.g. into the portable smart device). The controls tell the actuator system 2 to engage or to disengage the automatic steering of the vehicle. The controls may also receive instructions from the guidance system 6 to instruct the actuator 2 when to turn the wheel for steering control.

The present invention can be used on existing steering wheel configurations of all shapes and sizes. Once the present invention is installed, the vehicle is updated with automatic steering capabilities. The actuator system 2 is powered by the motor 9, and controlled via the controls 10 and the guidance system 6. The guidance system will instruct the actuator 8 on when to turn and how much to turn the wheel. The steering actuator system 2 is installed by connecting a gear 16 which is powered by the actuator 8 around a steering column 7 of a vehicle. The steering wheel 4 of the vehicle is connected to the steering actuator system 2 by several moveable sliders 12 which engage the central base plate 11. This combination of elements locks the actuator system 2 against the steering wheel 4 and is configured to work with a wheel having any number of spokes 5 joining the wheel 4 to the steering column 7.

The controls 10 may also include the vehicle's built in controls, such as the brake pad and clutch of the vehicle. For example, depressing the brake pad manually may disengage the steering actuator. The controls may also be remotely located from the vehicle, including a remote computer system including vision controls, a joystick, or controls from other autonomous driverless vehicles.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A steering actuator mounting system comprising:
   a flat base plate having a plurality of branches, each branch containing a channel guide slot;
   a respective adjustable slider slidably engaged with each of said plurality of channel guide slots;
   an adjustment screw configured to adjust each said adjustable slider within each said channel guide slot; and
   each said adjustable slider including a concave receiver face configured to engage a steering wheel rim of a vehicle.

2. The system of claim 1, further comprising:
   a gear located beneath said steering wheel and around a steering column of said vehicle, said gear connected to said flat base plate via a plurality of screws and spacers; and
   a steering actuator connected to said gear, said steering actuator configured to automatically turn said steering wheel thereby guiding said vehicle.

3. The system of claim 2, further comprising:
   a guidance subsystem configured to provide steering instructions to said steering actuator; and
   said guidance subsystem including an antenna and a receiver for a global navigation satellite system (GNSS).

4. The system of claim 3, wherein said guidance subsystem comprises a portable computing device having a processor, a graphical user interface (GUI), and data storage.

5. The system of claim 4, further comprising:
   a control subsystem configured to engage said steering actuator;
   said control subsystem configured to electronically communicate with said guidance subsystem; and
   said control subsystem configured to disengage said steering actuator.

6. The system of claim 5, wherein said control subsystem comprises said portable computing device.

7. The system of claim 5, wherein said control subsystem comprises the brake pad of said vehicle.

8. The system of claim 2, further comprising:
   said flat base plate including a plurality of receiver holes for receiving said plurality of screws and spacers; and
   said screws and spacers configured to be placed to avoid spokes of said steering wheel.

9. A method of installing a steering actuator mounting system, the method comprising the steps:
   adjusting a plurality of sliders on a flat base plate such that said sliders are configured to engage a steering wheel rim, each said slider slideably engaging a respective channel guide slot, and each of said sliders including a threaded screw and a hex nut for radial adjustment along said respective channel guide slot;
   placing said sliders against said steering wheel rim;
   further adjusting said sliders to facilitate a firm engagement against said steering wheel rim; and
   tightening said adjustment screws, thereby positioning the flat base plate in proximity of the center of said steering wheel.

10. The method of claim 9, wherein a screw centerline is offset from the steering wheel rim to allow access to each screw head.

11. The method of claim 9, wherein said screws are selected from the list comprising: including Phillips, socket head, torx, hex head, and thumbscrews.

12. The method of claim 9, further comprising the steps:
    connecting a steering actuator to a steering column of said vehicle;
    placing a gear beneath said steering wheel and connecting said steering actuator to said gear;
    connecting said gear to said flat base plate via a plurality of screws and spacers;
    powering said steering actuator with a power source; and
    steering said vehicle with said steering actuator.

13. The method of claim 11, wherein said power source is chosen from the list comprising: a gear; a pulley; an electric motor; a chain and sprocket; a belt and pulley; a cable; and a hydraulic motor.

14. The method of claim 11, further comprising the steps:
    connecting a guidance subsystem to said steering actuator, said guidance subsystem including an antenna and a receiver for a global navigation satellite system (GNSS); and
    providing steering instructions to said steering actuator with said guidance subsystem.

15. Method of claim 13, wherein said guidance subsystem comprises a portable computing device having a processor, a graphical user interface (GUI), and data storage.

16. The method of claim 14, further comprising the steps:
    connecting a control subsystem to said steering actuator;
    instructing said steering actuator to engage with said control subsystem;
    said control subsystem electronically communicating with said guidance subsystem; and
    disengaging said steering actuator with said control subsystem.

17. The method of claim 15, wherein said control subsystem comprises said portable computing device.

18. The method of claim 15, wherein said control subsystem comprises the brake pedal of said vehicle.

19. The method of claim 17, further comprising the steps:
    depressing said brake pedal of said vehicle; and
    disengaging said steering actuator.

* * * * *